US009979557B2

(12) United States Patent
Roy et al.

(10) Patent No.: US 9,979,557 B2
(45) Date of Patent: May 22, 2018

(54) CARRIER GRADE ETHERNET LAYER 2 OVER LAYER 3 SATELLITE BACKBONES (L2OL3SB)

(71) Applicant: Hughes Network Systems, LLC, Germantown, MD (US)

(72) Inventors: Satyajit Roy, Germantown, MD (US); George Choquette, Germantown, MD (US); Archana Gharpuray, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 89 days.

(21) Appl. No.: 14/822,324

(22) Filed: Aug. 10, 2015

(65) Prior Publication Data

US 2017/0048143 A1   Feb. 16, 2017

(51) Int. Cl.
| | |
|---|---|
| *H04L 12/28* | (2006.01) |
| *H04L 29/06* | (2006.01) |
| *H04L 12/46* | (2006.01) |
| *H04L 29/12* | (2006.01) |

(52) U.S. Cl.
CPC .............. *H04L 12/28* (2013.01); *H04L 12/46* (2013.01); *H04L 69/22* (2013.01); *H04L 61/103* (2013.01); *H04L 61/6009* (2013.01); *H04L 61/6022* (2013.01); *H04L 2212/00* (2013.01)

(58) Field of Classification Search
CPC .............. H04L 12/4604; H04L 12/4625; H04L 12/4633; H04L 29/12018; H04L 45/50; H04L 12/28; H04L 69/22; H04L 12/46

USPC .......................................................... 370/392
See application file for complete search history.

(56) References Cited

U.S. PATENT DOCUMENTS

| | | | | |
|---|---|---|---|---|
| 2003/0179761 A1* | 9/2003 | Dobbins | ................. | H04L 45/54 370/401 |
| 2005/0007962 A1* | 1/2005 | Nam | ................. | H04L 29/12018 370/252 |
| 2008/0144632 A1* | 6/2008 | Rabie | .................. | H04L 12/4604 370/395.5 |
| 2008/0192740 A1* | 8/2008 | Lorusso | .............. | H04L 12/4633 370/389 |
| 2009/0034738 A1* | 2/2009 | Starrett | ................. | H04L 63/162 380/278 |
| 2010/0121957 A1* | 5/2010 | Roy | .................... | H04L 63/1466 709/227 |
| 2011/0261812 A1* | 10/2011 | Kini | .................... | H04L 12/4633 370/389 |

(Continued)

*Primary Examiner* — Sai Ming Chan
(74) *Attorney, Agent, or Firm* — Nath, Goldberg & Meyer; Leonid D. Thenor

(57) ABSTRACT

An apparatus is disclosed for delivering layer-2 services over a layer-3 network. The apparatus includes a layer-2 module for transmitting and receiving layer-2 packets over a first communication network, and a layer-3 module for converting the layer-2 packet into a format that can be transmitted over a conventional layer-3 network. The converted layer-2 packet is transmitted with sufficient information to allow reconstruction of the original layer-2 packet at the destination device. The apparatus can also be configured to simultaneously transmit and receive layer-2 packets and layer-3 packets over the layer3 network.

25 Claims, 12 Drawing Sheets

(56) References Cited

U.S. PATENT DOCUMENTS

2012/0106413 A1* 5/2012 Huang ................ H04L 1/0079
370/310
2013/0297768 A1* 11/2013 Singh ...................... H04L 43/00
709/224

* cited by examiner

CARRIER GRADE ETHERNET LAYER 2 OVER LAYER 3 SATELLITE BACKBONES (L2OL3SB)

BACKGROUND INFORMATION

A continually increasing trend facing service providers of voice and data communication networks is ability to provide services to consumers in locations that are not, or can not, be served by conventional land line (e.g., wire, coaxial, fiber, etc.) infrastructures. As the number and types of services available over such networks increases, consumer demand for access to such services also increases. Consumers utilize devices such as mobile phones, tablets, computers, etc. to obtain various types of content which can often require greater bandwidth and a higher quality of service than only a short period of time prior. Satellite communication networks have greatly increased access to consumers located in remote and/or non-conventional locations (e.g., rural, aero, marine, etc.).

Satellite communication networks typically operate at the network level (i.e., layer-3) of the Open Systems Interconnection (OSI) reference model. The network layer (or layer-3) implements a suite of protocols that allow packets to be routed from a source to a destination. Some of the layer-3 functions include routing, congestion control, accounting, and packet assembly/disassembly. While satellite communication networks are becoming more widely available, the costs associated with transmission/reception to/from the satellite can be higher than networks operating on land lines.

Carrier grade Ethernet, or carrier Ethernet, has emerged as a ubiquitous, standardized service that can be delivered not only over traditional (native) Ethernet-based networks but can also be delivered over the data link layer (or layer-2) of the OSI reference model. Thus, carrier Ethernet can often be used in place of existing transport technologies such as frame relay and asynchronous transfer mode (ATM). E-line is a standardized service defined by the Metro Ethernet Forum (MEF) for establishing a point-to-point Ethernet Virtual Circuit (EVC) to deliver carrier Ethernet between two network interfaces.

This unified approach can cost effectively extend the benefits of Ethernet to help both service providers and end users of carrier Ethernet services achieve substantial savings. Carrier Ethernet also offers a wide range of granular bandwidth and quality of service (QoS) options. While carrier Ethernet is capable of providing numerous benefits to terrestrial networks, further benefits can be achieved when combined with satellite transport. Such benefits can be achieved, for example, by layer 3 networking applications/configurations that make use of layer 3 Internet or intranet access when carried terrestrially, as well as layer 2 applications that make use of layer 2 network access when carried terrestrially. Based on the foregoing, there is a need for an approach which facilitates transport of both layer 3 and layer 2 applications over the same satellite layer 3 network, while advantageously using the integral network QoS and efficient bandwidth capabilities of the satellite network for both types of traffic.

BRIEF SUMMARY

An apparatus, method, and system are disclosed for delivering layer-2 services over a layer-3 network. According to an embodiment, the apparatus includes a layer-2 module having an interface for transmitting and receiving layer-2 packets to/from one or more entities over a first communication network; and a layer-3 module for receiving the layer-2 packets from the layer-2 module, the layer-3 module including: an interface for transmitting and receiving layer-3 packets, and at least one processor configured to: generate a header for each layer-2 packet, each header including, in part, a WAN address associated with a destination terminal and a WAN address associated with the interface of the layer-3 module, the destination terminal being selected from a plurality of destination terminals, and the interface of the layer-3 module and plurality of destination terminals being part of a second communication network; create a context ID for each layer-2 packet based, at least in part, on header information contained in each respective layer-2 packet; combine the header and context ID with a payload from each respective layer-2 packet to form an encapsulated layer-2 packet; and transmit the encapsulated layer-2 packet to selected destination terminals over the second communication network, wherein the second communication network is configured to carry only layer-3 packets.

According to another embodiment, the method includes receiving layer-2 packets, at a gateway, from one or more entities over a first communication network; generating a header for each layer-2 packet, each header including, in part, a wide area network (WAN) address associated with a destination terminal and a WAN address associated with the gateway, the destination terminal being selected from a plurality of destination terminals, and the gateway and plurality of destination terminals being part of a second communication network; creating a context ID for each layer-2 packet based, at least in part, on header information contained in each respective layer-2 packet; combining the header and context ID with a payload from each respective layer-2 packet to form an encapsulated layer-2 packet; and transmitting the encapsulated layer-2 packet to selected destination terminals over the second communication network, wherein the second communication network is configured to carry only layer-3 packets.

According to another embodiment, the system includes a plurality of destination terminals, each including an interface for transmitting and receiving layer-3 packets; and a gateway including: a layer-2 module having an interface for transmitting and receiving layer-2 packets from one or more entities over a first communication network; a layer-3 module for receiving the layer-2 packets from the layer-2 module, and including an interface for transmitting and receiving layer-3 packets; and at least one processor configured to: generate a header for each layer-2 packet, each header including, in part, a WAN address associated with a selected destination terminal and a WAN address associated with the interface of the layer-3 module, the interface of the layer-3 module and plurality of destination terminals being part of a second communication network; create a context ID for each layer-2 packet based, at least in part, on header information contained in each respective layer-2 packet; and combine the header and context ID with a payload from each respective layer-2 packet to form an encapsulated layer-2 packet, wherein the interface of the layer-3 module is configured to transmit the encapsulated layer-2 packet to selected destination terminals over the second communication network, and wherein the second communication network is configured to carry layer-3 only packets.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for delivering link layer (layer-2) services over network layer (layer-3), are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
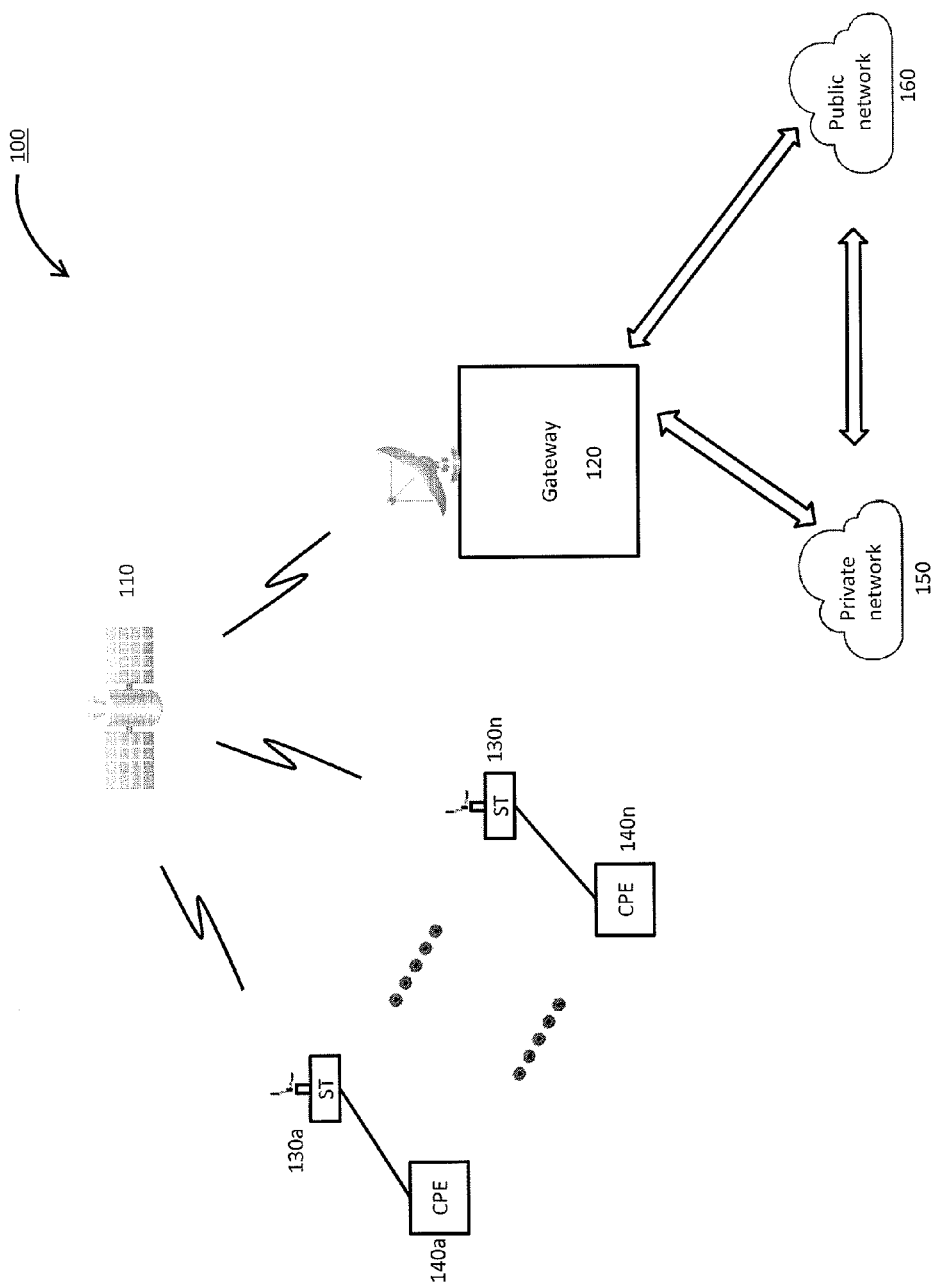
FIG. 1 is a diagram of a conventional satellite communication system capable of providing voice and data services.

FIG. 1 illustrates an exemplary satellite communication system 100 capable of supporting communications among terminals with varied capabilities, according to one or more embodiments. The communication system 100 includes a satellite 110 that supports communications among a number of gateways 120 (only one shown) and multiple satellite terminals (STs) 130a-130n. According to various embodiments, the Satellite link constitutes a Wide-Area Network (WAN). Each satellite terminal (or terminal) 130 can be configured for relaying traffic between its customer premise equipment 140a-140n, a public network such as the Internet 160, and/or from its private network 150. The gateway 120 can be configured to route this traffic across the private network 150 and public Internet 160 as appropriate. The gateway 120 can be further configured to route traffic from the private network 150 and public Internet 160 across the satellite link to the appropriate terminal 130. The terminal 130 then routes the traffic to the appropriate customer premise equipment 140.

As illustrated in FIG. 1, the satellite communication system 130 facilitates communication between a satellite network, private communication networks 150, and public communication networks 160. Various embodiments, however, can also be configured for providing communication within only a terrestrial network (e.g., private communication networks 150 and public communication networks 160), or within only a satellite network. Thus, while components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 130 illustrated in FIG. 1 is only intended to be illustrative, and in no way restrictive.

Figure 2:
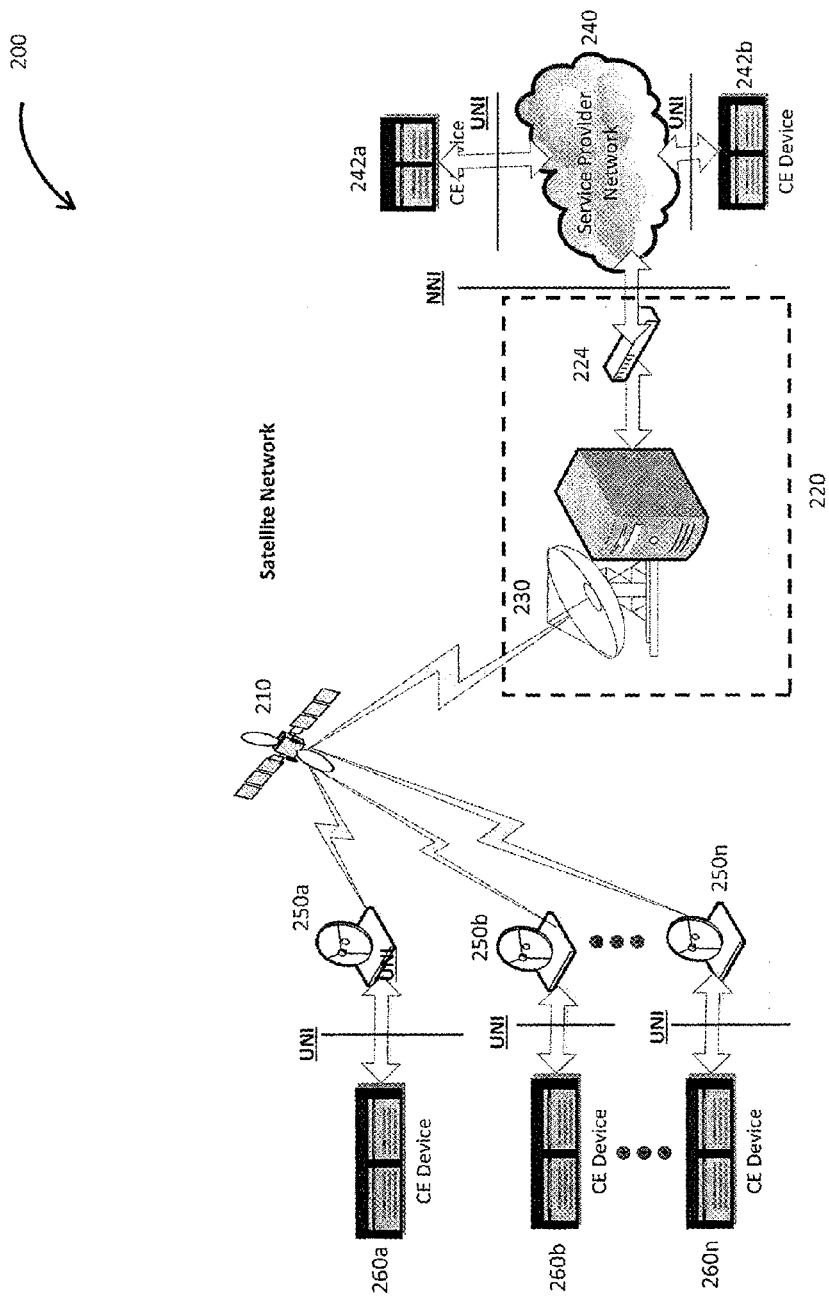
FIG. 2 is a diagram of a system capable of delivering layer-2 services over a layer-3 network, according to one embodiment.

FIG. 2 illustrates a system for transmitting layer-2 packets over a layer-3 network, in accordance with various embodiments. The system 200 includes a satellite 210, a gateway 220, and a plurality of terminals 250 which form the layer-3 network. As illustrated, the gateway 220 can include various components which allow it to interact with external service providers, and also to transmit and receive information to and from the satellite 210. For example, according to an embodiment, the gateway 220 can include a computer or CPU 222 capable of being configured to perform various tasks in connection with the various hardware components attached thereto. For example, the gateway 220 can further include an interface 224 which provides a physical connection to external networks such as the Internet, or the illustrated service provider network 240. Although FIG. 2 illustrates a single service provider network 240, it should be noted that various embodiments can allow for interaction with different and/or multiple networks that can be public, private, or both.

FIG. 2 further illustrates two customer premise equipment or devices 242a, 242b. The customer devices 242 can belong to individuals and/or various entities that subscribe to service from a particular service provider. The customer devices 242 can be in the form of any devices capable of establishing a wired or wireless connection over the service provider network 240. Examples of such devices include, but are not limited to, computers, servers, tablet, laptops, mobile phones, media players, smart televisions, etc.

Information transmitted over the service provider network 240 is received by the gateway 220 through interface 224. For purposes of illustration, a single interface 224 is illustrated in FIG. 2. It should be noted, however, multiple interfaces can be provided. Furthermore, different types of interfaces can be provided. For example, interface 224 can be in the form of a physical connection point, router, switch, etc. Furthermore, the different types of devices and interfaces can be utilized in combination with each other.

According to the illustrated embodiment, the gateway 220 is configured to operate at the layer-3 level in order to establish a network for providing layer-3 services between the satellite 210 and the terminals 242. The interface 224 and/or the CPU 222 can therefore receive packets from the service provider network 240 at either the layer-3 level and layer-2 level, and perform appropriate processing so that transmissions on out-routes to the satellite 210 carry layer-3 accessible packets. The gateway 220 also includes a transmission unit 230 which facilitates transmission and reception of information to/from the satellite 210.

Information transmitted from the gateway 220 is supplied to the terminals 250 along a bent pipe path by means of the satellite 210. As will be discussed in greater details below, the terminals 250 can include appropriate hardware and software for processing both conventional layer-3 packets, as well as layer-2 packets that have been encapsulated, in part, with a layer-3 header for transmission and reception over the layer-3 network in accordance with various embodiments. The terminals 250 perform appropriate processing of revived packets to identify and forward conventional layer-3 packets, while also processing encapsulated layer-2 packets so that the original layer-2 packets are reconstructed and forwarded to the appropriate customer devices 260. Thus, information received from the service provider network 240 at either the layer-2 or layer-3 level can be appropriately transmitted to the receiving customer devices 260 over the layer-3 satellite network. As used herein, the term "encapsulated layer-2 packet" corresponds to a layer-3 packet generated by applying various features and techniques described herein to a conventional layer 2 packet. An "encapsulated layer-2 packet" includes necessary layer-3 header information for transport over a layer-3 network, and can be transported seamlessly with conventional layer-3 packets. Although the layer-3 network illustrated in FIG. 2 is part of a satellite communication system, it should be noted that other embodiments can operate over conventional, or wired, layer-3 networks. Thus, the features illustrated in the various embodiments are not limited to satellite communication systems.

Figure 3:
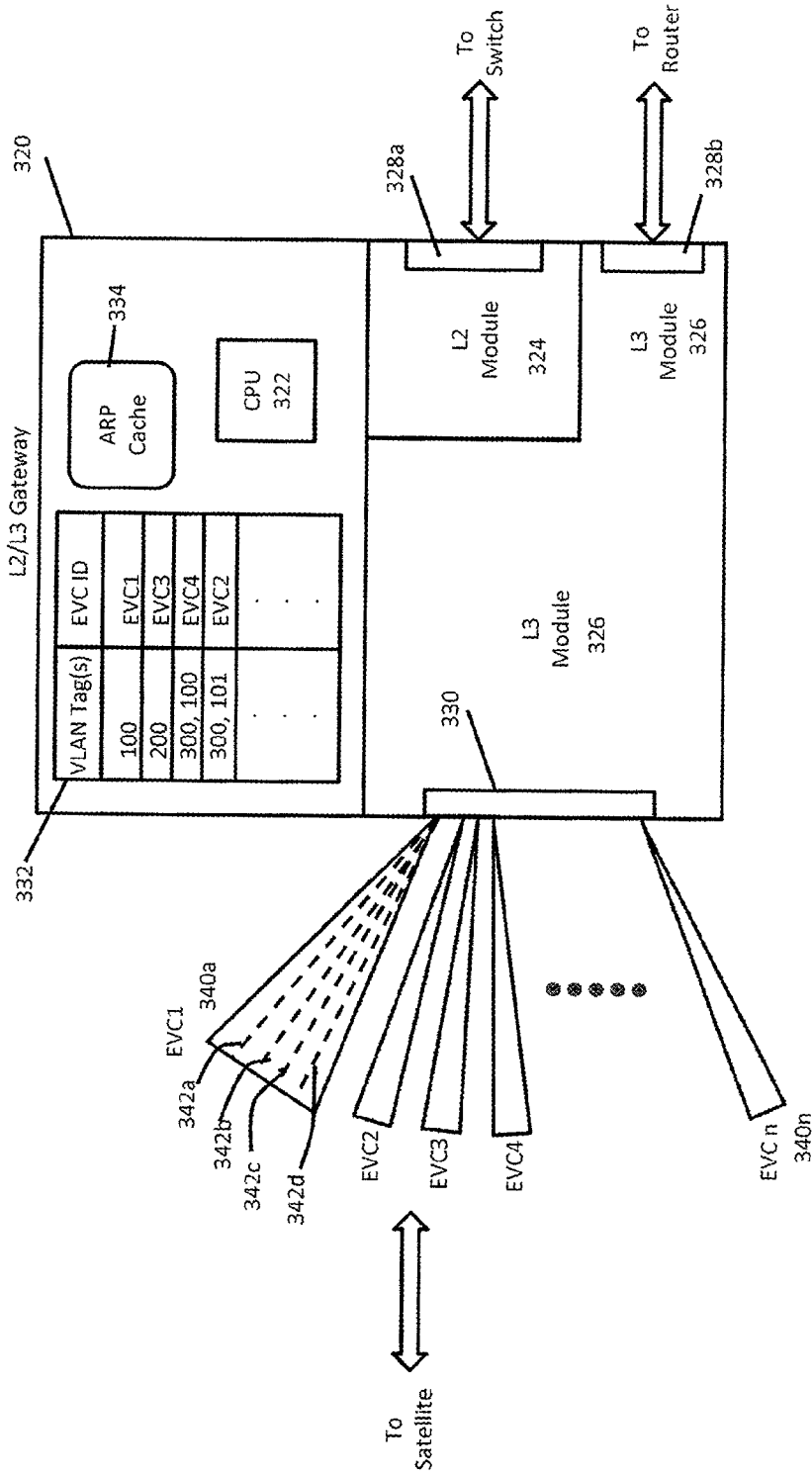
FIG. 3 is a diagram of a gateway capable of being used in the system of FIG. 2, according to one embodiment.

FIG. 3 is a diagram illustrating various details of a gateway 320 capable of being used in the system of FIG. 2, according to at least one embodiment. The gateway 320 includes a layer-2 module 324 capable of processing packets received at the layer-2 level through an interface 328*a*. The gateway 320 further includes a layer-3 module 326 capable of receiving and processing layer-3 packets received through interface 328*b*. According to the illustrated embodiment, the layer-2 module 324 is configured for receiving the layer-2 packets from an external switch (not shown). Additionally, the layer-3 module 326 is configured for receiving layer-3 packets from an external router (not shown) via the interface 328*b*. According to at least one embodiment, the layer-3 module 326 can further include interface 330 for communicating with the satellite. According to at least one embodiment, interface 330 can be part of the transmitter itself and/or a separate component that is connected to the transmitter.

The gateway 320 also includes a CPU 322 that can be configured to perform various functions. Although FIG. 3 illustrates a single CPU 322, it should be noted that various embodiments can allow for multiple CPUs and/or various computers/servers which cooperate to process the received packets and transmit them along an out route to the satellite. According to at least one embodiment, the gateway 320 can maintain and address resolution processing (ARP) cache 334 which maintains tables that identify the medium access control (MAC) addresses associated with corresponding IP network address. Thus, as packets are transmitted and received by the gateway 320, the ARP cache 334 is examined in order to determine whether a MAC address has already been determined for a particular IP address. If the IP address has already been resolved, then the MAC address stored in the ARP 334 cache is utilized. Otherwise, the gateway 320 can perform the necessary steps and processes for determining the MAC address.

According to an embodiment, the gateway 320 can broadcast an ARP message requesting the MAC address associated with the IP address, and wait for a response which identifies the correct MAC address. Once received, for example, the ARP cache 334 is updated to associate the MAC address received with the corresponding IP address. According to other embodiments, the gateway 320 can also utilize a neighbor discovery protocol (NDP) in order to identify the MAC address associated with the IP address. According to an embodiment, layer-2 packets received by the layer-2 module 324 are provided to the layer-3 module 326 for additional processing prior to being transmitted to the satellite.

Figure 5:
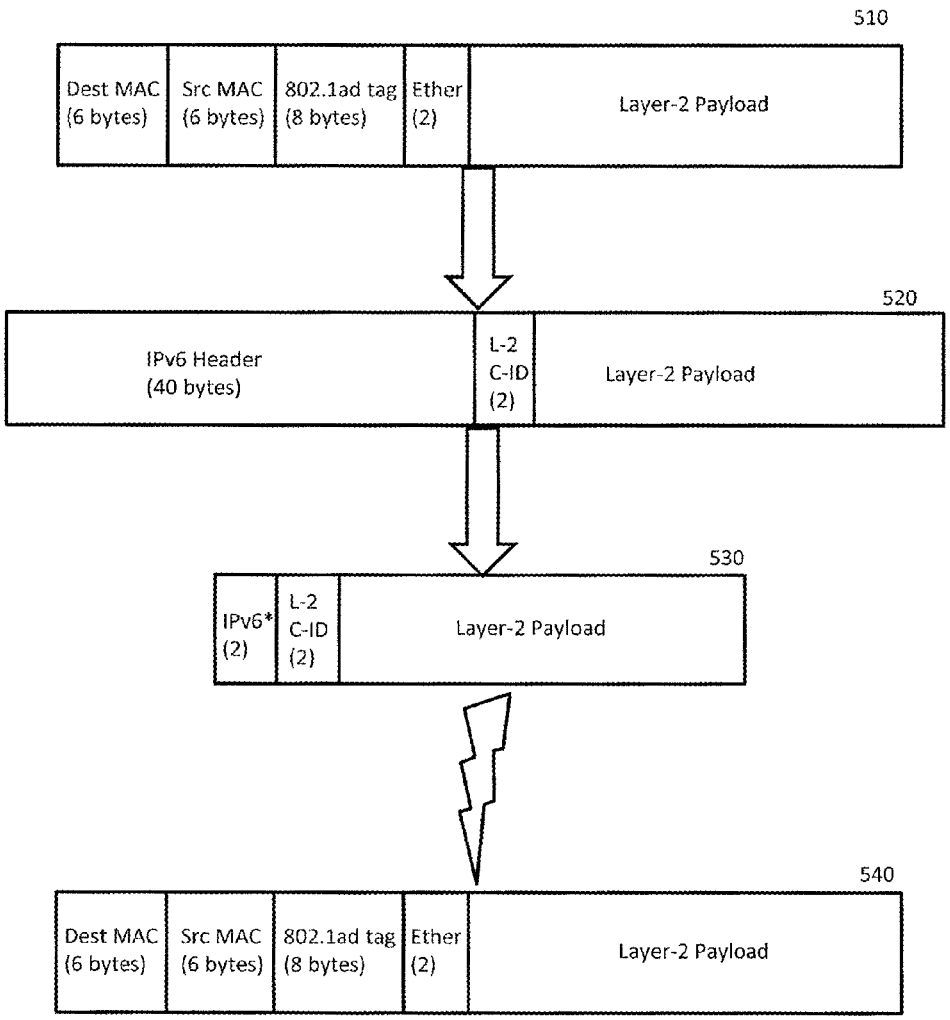
FIG. 5 is a diagram illustrating the processing of a layer-2 packet for delivery over a layer-3 network, according to one embodiment.

Referring additionally to FIG. 5, the format of a conventional layer-2 packet 510 is illustrated. The header of the layer-2 packet 510 received by the layer-2 module 324 includes fields for a destination MAC address, source MAC address, VLAN tag, ether type, and layer-2 payload. On the return link, the source and destination MAC addresses are reversed. According to various embodiments, however, the VLAN field can include a double tag in accordance with 802.1ad (as illustrated) or a single tag in accordance with 802.1q. Alternatively, the VLAN field can be excluded in the case of an untagged packet. According to the illustrated embodiment, the layer-2 header is 22 bytes in length when a double tag is supplied. If a single tag is supplied, however, then the length of the layer-2 header is reduced by 4 bytes to 18 bytes. Additionally, an untagged packet would result in a header that is 14 bytes in length.

The layer-3 module 326 receives the layer-2 packet 510 and generates an IP header for subsequent encapsulation of the layer-2 payload. According to at least one embodiment, the IP header can be in the form of an IPv6 header. The layer-3 module 326 further generates a layer-2 context ID (or simply context ID) which is based, in part, on information contained in the layer-2 header. The context ID is created with sufficient information for reconstructing the original layer-2 packet. The context ID can further be created such that it establishes a relationship between the received layer-2 packet, the gateway 320, and the destination terminal on a per session basis. According to at least one embodiment, the relationship can further include information pertaining to one or more Ethernet virtual circuits (EVC) that are used for transmitting layer-2 packets that have been appropriately processed. The layer-3 module 326 encapsulates the layer-2 packet with the layer-2 context ID and IPv6 header, as shown in packet 520 of FIG. 5.

Prior to transmission over the satellite network, the layer-3 module 326 applies a compression algorithm to the IPv6 header in order to reduce its length. According to at least one embodiment, robust header compression (ROHC) can be applied to reduce the length of the IPv6 header. The resulting encapsulated layer-2 packet 530 consists of the compressed IPv6 header, the layer-2 context ID, and the original layer-2 payload. Since the layer-2 payload remains untouched, the encapsulated layer-2 packet 530 is reduced in length based on the difference between the encapsulated layer-2 packet header and the original layer-2 header. For example, if a double tag layer-2 packet is used, the header information is 22 bytes in length. This is illustrated using the layer-2 packet 510 shown in FIG. 1. Compression of the IPv6 header results in an encapsulated layer-2 packet having a header that is 4 bytes in length prior to transmission over the satellite network. Thus, an 18 byte reduction can be achieved without affecting the content, or delivery, of the layer-2 payload.

Returning to FIG. 3, the gateway 320 also maintains and EVC table 332 which stores information pertaining to the specific EVC assigned to transmit the encapsulated layer-2 packet. For example, the table can store the values for single tag layer-2 packets, double tag layer-2 packets, or untagged layer-2 packets. According to the illustrated embodiment, the first entry of the EVC table indicates that VLAN tag 100 has been mapped to EVC1 340a, while VLAN tag 200 has been mapped to EVC3 340c. The 3rd and 4th entries correspond to double-tagged layer-2 packets, and indicate that VLAN tag (300, 100) is mapped to EVC4 340c, while VLAN tag (300, 101) is mapped to EVC2 340b. According to at least one embodiment, the gateway 320 can be configured to identify the start of individual IP flows and generate the IPv6 header and layer-2 context ID for the first layer-2 packet. All subsequent packets determined to be part of the same IP flow can automatically be assigned the same IPv6 header and layer-2 context ID, without the need to perform additional processing.

According to one or more embodiments, each EVC 340 can include a plurality of backbones for transporting data. As illustrated in FIG. 3, EVC1 348 can include, for example, four individual backbones, namely 342a, 342b, 342c, and 342d. Each backbone 342 can be individually configured with a backbone priority that allows achievement of a desired quality of service (QoS), based on customer requirements. For example, backbone 342a-342d can be assigned priorities 1-4, respectively. During times of heavy congestion, higher priority packets can be transmitted using the higher priority backbones (i.e., backbones 342a and/or backbone 342b), while allowing latency for, or dropping of, lower priority packets. According to various embodiments, the traffic classes associated with received layer-2 packets can be maintained by mapping to a corresponding backbone 342. For example, by reviewing the priority bits contained in the VLAN field of the layer-2 packet header, the priority class can be determined and mapped to the appropriate EVC backbone 342, thereby maintaining the original QoS for the packet. If no priority is specified, then the layer-2 packet can be mapped to whichever backbone is assigned a normal priority level or class.

According to at least one embodiment, a performance enhancing proxy (PEP) can be applied to the encapsulated layer-2 packets in order to improve system performance. According to such embodiments, the layer-2 module and/or the layer-3 module 326 can examine the layer-2 payload in order to determine if it is encrypted. If the layer-2 payload is not encrypted, then the PEP can be applied to improve performance when transmitting the encapsulated layer-2 packet. If the layer-2 payload is encrypted, however, then no PEP is applied.

Figure 4:
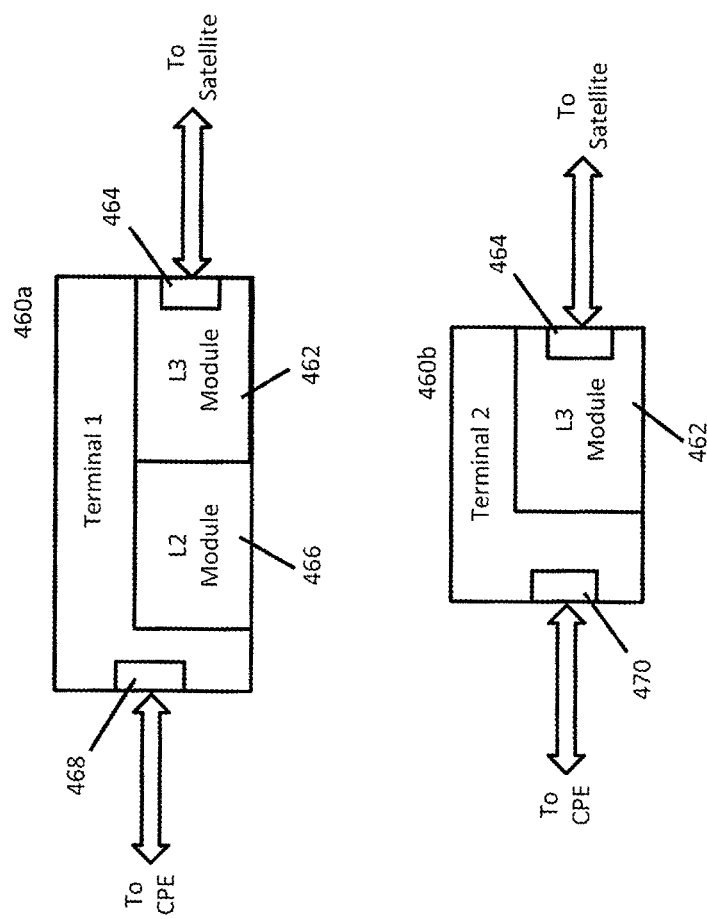
FIG. 4 is a diagram illustrating various terminals capable of being used in the system of FIG. 2, according to one embodiment.

FIG. 4 illustrates the details of various exemplary terminals capable of being used in the system of FIG. 2. Terminal 1 460a is configured for receiving both layer-3 packets and encapsulated layer-2 packets, while terminal 2 460b is configured for receiving only layer-3 packets. According to the illustrated embodiment, terminal 1 460a includes a layer-3 module 462 for processing layer-3 packets or encapsulated layer-2 packets received from the satellite through interface 464. When layer-3 packets are received, the layer-3 module 462 performs any necessary processing and forwards the layer-3 packet to a customer premise equipment via interface 468. When encapsulated layer-2 packets are received from the satellite, the layer-3 module 462 forwards the encapsulated layer-2 packets to the layer-2 module 466. According to an embodiment, the layer-2 module 466 is configured to decompress the IPv6 header and examine the layer-2 context ID in order to regenerate the original layer-2 packet. Referring additionally to FIG. 5, the reconstructed layer-2 packet 540 is identical to the original layer-2 packet 510 received at the gateway 320.

As previously discussed, terminal 2 460b is only configured for transmitting and receiving layer-3 packets. Accordingly, terminal 2 460b only includes a layer-3 module 462 which receives the transmitted packets from the satellite via interface 464. The received layer-3 packets are processed and output to an appropriate customer premise device, layer-3 device associated with the customer, or both. Accordingly, it is possible for different customers who subscribe to services from the same service provider to receive either layer-3 packets, encapsulated layer-2 packets, or a combination of encapsulated layer-2 and layer-3 packets over the satellite network.

Figure 6:
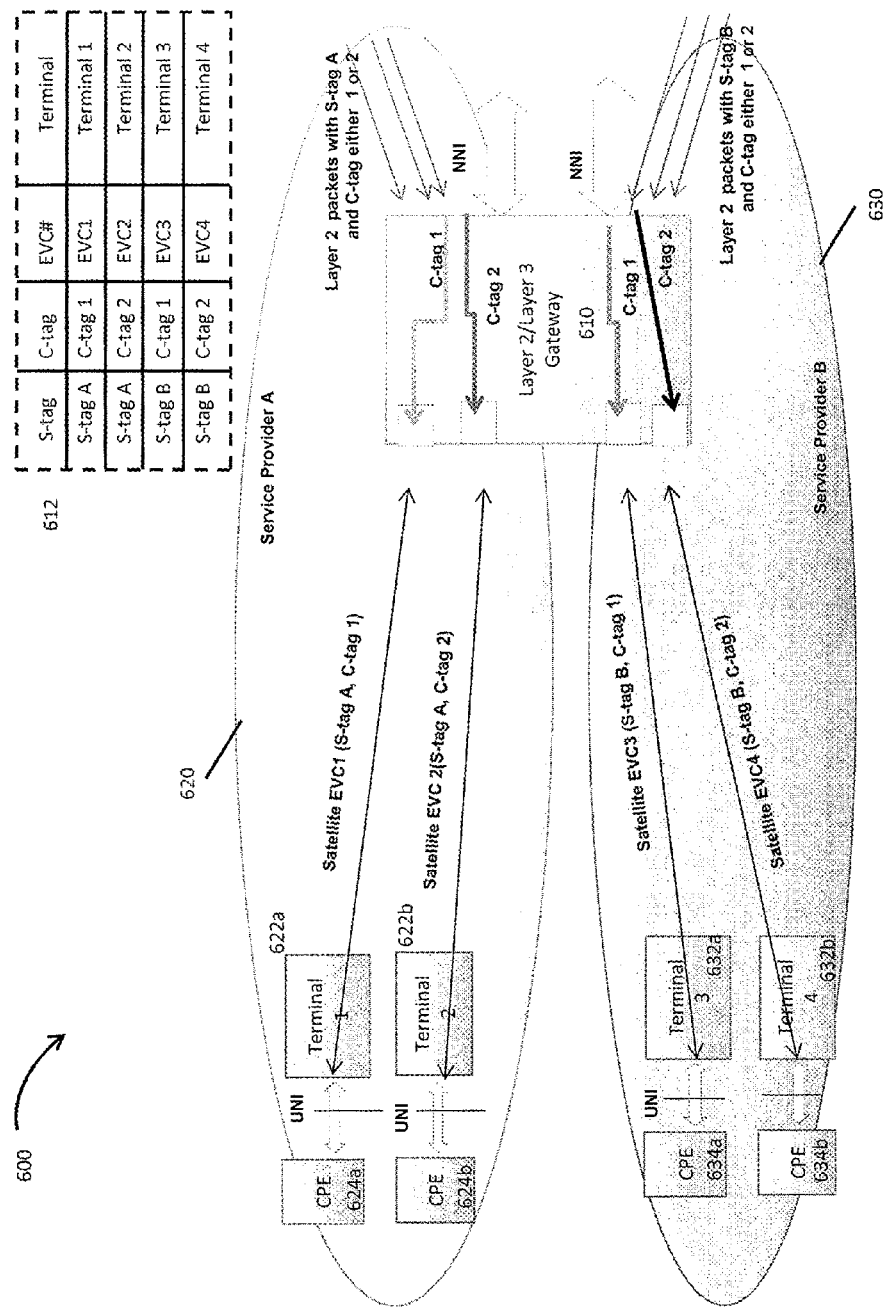
FIG. 6 is a diagram illustrating a system for delivering layer-2 and layer-3 services to different customer equipment over a layer-3 network, according to one embodiment.

FIG. 6 is a diagram illustrating a system 600 for delivering layer-2 and layer-3 services to different customer equipment over a layer-3 network, in accordance with at least one embodiment. The system 600 generally consists of a layer-2/layer-3 gateway 610, a first network that is operated by Service Provider A 620, and a second network 630 that is operated by Service Provider B 630. As previously discussed, various embodiments allow the gateway 610 to be configured for transmitting both layer-3 packets as well as encapsulated layer-2 packets over a layer-3 network such as a satellite network. Furthermore, Service Provider A 620 may only subscribe to layer-3 services, whereas Service Provider B 630 may subscribe to both layer-2 and layer-3 services. Thus, the hardware for processing layer-3 packets received from Service Providers A and B, as well as the hardware for processing layer-2 packets received from Service Provider B 630 can be shared within a common platform, or gateway 610.

FIG. 6 further illustrates an EVC table 612 that is maintained by the gateway 610. For purposes of explaining various features, the EVC table 612 has been illustrated separately. It should be noted, however, that the EVC table 612 is maintained by the gateway 610 and stored therein, as illustrated in the embodiment of FIG. 3. As previously discussed, the layer-2 packets received at the gateway 610 can be double tag. According to at least one embodiment, the tags can be configured as service provider tags (S-tag), and customer tags (C-tag). Thus, the S-tag values can be used to identify different service providers, whereas the C-tags values can be used to identify specific customers subscribing to service from a particular service provider.

According to the illustrated embodiment, Service Provider A 620 subscribes to S-tag A, and Service Provider B 630 subscribes to S-tag B. Two customers of Service Provider A 620 subscribe to C-tag 1 and C-tag 2. Similarly, to customers of Service Provider B 630 subscribe the same tags, i.e. C-tag 1 and C-tag 2. Since the double tags are used, however, customers subscribing to services from Service Provider A 620 can be distinguished from those subscribing to services from Service Provider B 630 based on different C-tags even if the same C-tags are used. As further illustrated in FIG. 6, customer 1 of Service Provider A 620 has been assigned to EVC1 for transmission and reception of packets with terminal 1 622a. Customer 2 of Service Provider A 620 has been assigned to EVC2 for transmission and reception of packets with terminal 2 622b.

As previously discussed, Service Provider A 620 only utilizes the layer-3 network for transmission of layer-3 packets. Thus, terminal 1 and terminal 2 622a, 622b of Service Provider A 620 can be configured with components for processing only layer-3 packets. Customer 1 of Service Provider B 630 has been assigned EVC3 for transmission and reception of packets with terminal 3 632a. Customer 2 of Service Provider B 630 has been assigned EVC4 for transmission and reception of packets with terminal 4 632b. As previously discussed, Service Provider B 630 subscribes to both layer-2 and layer-3 services over the satellite network. Thus, EVC3, EVC4, or both may be carrying layer-3 packets or encapsulated layer-2 packets. For example, if both terminal 3 632a and terminal 4 632b are configured for receiving encapsulated layer-2 packets as well is layer-3 packets, then each terminal would include a layer-3 module as well is a layer-2 module. Alternatively, only one terminal may be configured for receiving encapsulated layer-2 packets together with layer-3 packets. For example, terminal 3 632a may be configured for receiving encapsulated layer-2 as well as layer-3 packets, whereas terminal 4 632b can be configured for receiving only layer-3 packets. Depending on the specific configuration, the gateway 610 can determine which EVC will be use to transmit the required packets. For example, the gateway 610 would assign all encapsulated layer-2 packets to EVC3 for delivery to terminal 3 632a. Additionally, the gateway 610 can assign layer-3 packets to EVC3. Terminal 4 632b, however, would only receive layer-3 packets on EVC4.

The packets received at terminal 1 622a can be processed and forwarded to customer premise equipment 624a. Similarly, terminal 2 622b processes the layer-3 packets received from the satellite and forwards them to customer premise equipment 624b. Depending on the specific embodiment, terminal 3 632a may process both encapsulated layer-2 packets or layer-3 packets. Thus, terminal 3 632a may forward either layer-3 or layer-2 packets to customer premise equipment 634a. Terminal 4 632b processes layer-3 packets and forwards them to customer premise equipment 634b.

Figure 7:
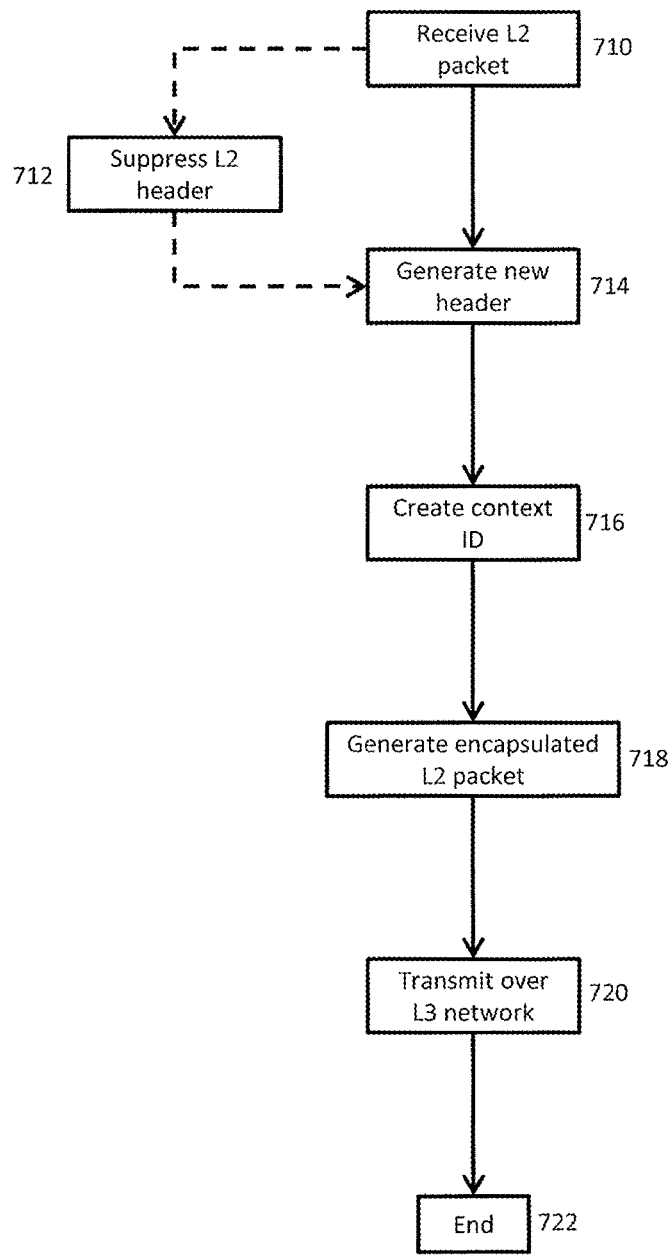
FIG. 7 is a flowchart of a process for delivering layer-2 services over a layer-3 network, according to one embodiment.

FIG. 7 is a flowchart illustrating the steps performed for delivering layer-2 packets over a layer-3 network, in accordance with at least one embodiment. At 710, layer-2 packets are received. As previously discussed, this can correspond to conventional layer-2 packets that are received at the gateway. According to at least one embodiment, the header of the layer-2 packet can optionally be suppressed (or removed). This is indicated at 712 by the broken line path. At 714, a new header is generated for the layer-2 packet. As previously discussed, the new header can be in the form of an IPv6 header. At 716, a context ID is created. The context ID can be used, for example, to incorporate information that can be used, in part, to reconstruct the original layer-2 header associated with the layer-2 packet. At 718, an encapsulated layer-2 packet is generated. According to at least one embodiment, the encapsulated layer-2 packet includes the original layer-2 payload, the context ID, and the IPv6 header. At 720, the encapsulated layer-2 packet is transmitted over the layer-3 network. The process ends at 722.

Figure 8A:
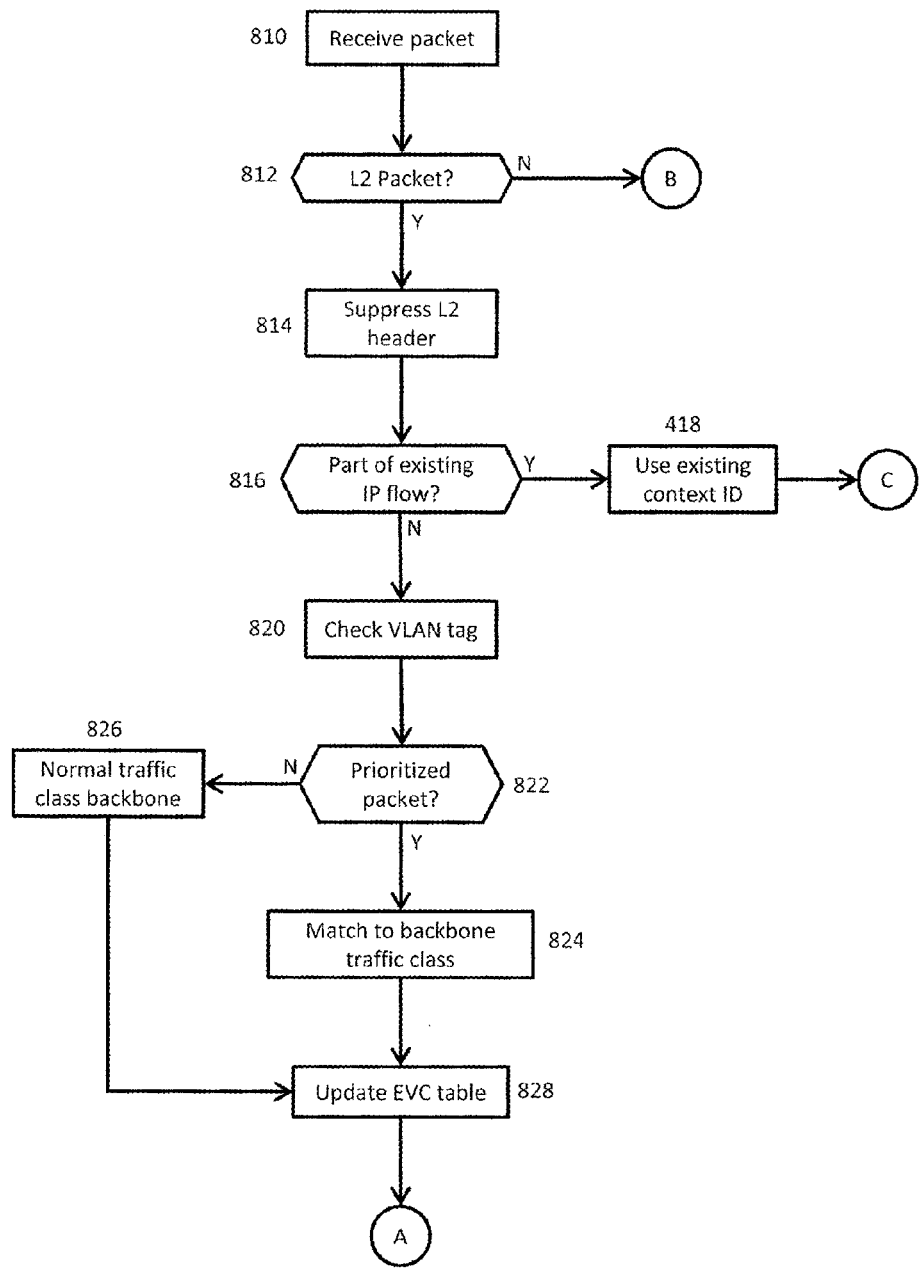
FIGS. 8A and 8B are a flowchart of a process for delivering layer-2 and layer-3 services to customers over a layer-3 network, according to one embodiment.
Figure 8B:
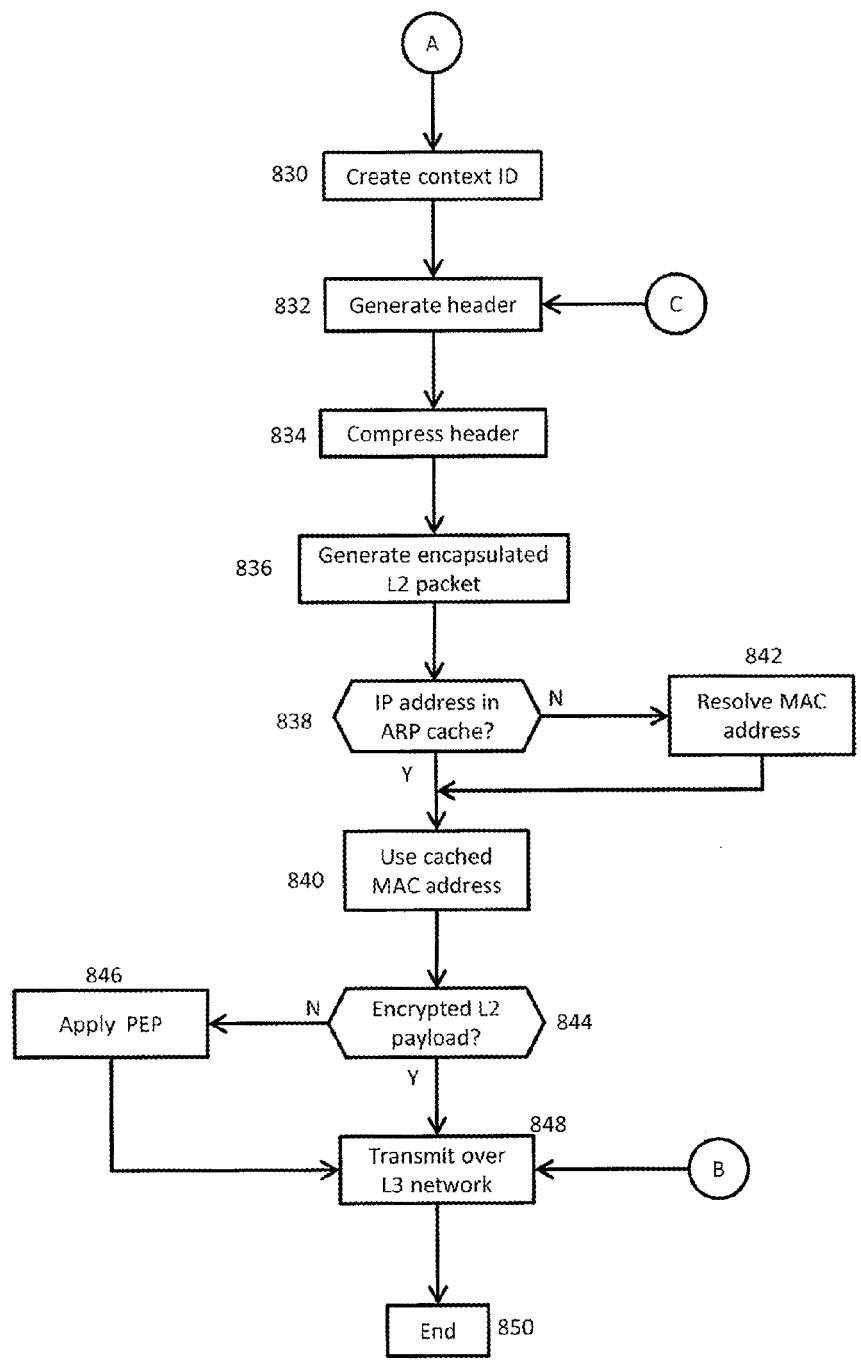

FIGS. 8A and 8B are a flowchart illustrating a process for delivering layer-2 and layer-3 services to customers over a layer-3 network, in accordance with one or more embodiments. At 810, a packet is received, for example, at the gateway. At 812, it is determined whether the received packet is a layer-2 packet. Depending on the specific embodiment, the gateway may be configured to receive layer-2 packets independently from layer-3 packets. According to such embodiments, it is not necessary to determine whether the received packet is a layer-2 packet. Rather, layer-3 packets would be processed independently from the layer-2 packets.

If it is determined that the received packet is not a layer-2 packet, then control passes to 848. The packet is subsequently transmitted over the layer-3 network in accordance with conventional processing. If it is determined that the packet is a layer-2 packet, then control passes to 814, where the layer-2 header can be optionally suppressed. According to an embodiment, at 816, a test is performed to determine whether the received layer-2 packet is part of an existing IP flow. If the received layer-2 packet is part of an existing IP flow, then the existing context ID that was used for previous packets is used for the newly received layer-2 packet. This is illustrated at 818. Control then passes to 832.

At 820, the VLAN tag from the layer-2 header is examined. At 822, it is determined whether the layer-2 packet has a priority class associated therewith. If a priority class is associated with the layer-2 packet, then it is matched to the backbone traffic class of an assignable EVC. If no priority class is associated with the layer-2 packet, it is matched to a normal backbone traffic class at 826. At 828, the EVC table is updated to indicate, for example, the specific EVC over which the layer-2 packet will be transmitted. At 830, a context ID is created for the layer-2 packet. The context ID can be created, in part, based on information contained in the original layer-2 header, information pertaining to the EVC assigned to transmit the packet, etc. At 832, a header is created for the layer-2 packet. At 834, the header is compressed. As previously discussed, the header can be in the form of an IPv6 header. Furthermore, various compression algorithms can be utilized including, for example, ROHC. At 836, the encapsulated layer-2 packet is generated. This can be done, for example, by combining the original layer-2 payload with the context ID and the compressed IPv6 header.

According to at least one embodiment, prior to transmitting the encapsulated layer-2 packet, the ARP cache can be searched in order to determine whether the IP address of the destination terminal present. If the IP address is not present in the ARP cache, then various steps can be performed by the gateway in order to resolve the MAC address of the destination terminal. If the IP address is present in the ARP cache, then the cached MAC address is used as the destination MAC address. At 844, it is determined whether the layer-2 payload is encrypted. If the layer-2 payload is not encrypted, then an appropriate PEP can be applied at 846. Alternatively, if the payload is encrypted, then the encapsulated layer-2 packet is transmitted over the layer-3 network at 848. The process ends at 850.

While FIGS. 7, 8A, and 8B have been described with respect to transmission of packets from the gateway to various destination terminals (forward link), it should be appreciated that packets are also transmitted from the destination terminals to the gateway (return link). The various features applied for transmission along the forward link are also appropriately applied on the return link. In particular, the source and destination addresses used in the IPv6 header are reversed on the return link.

Figure 9:
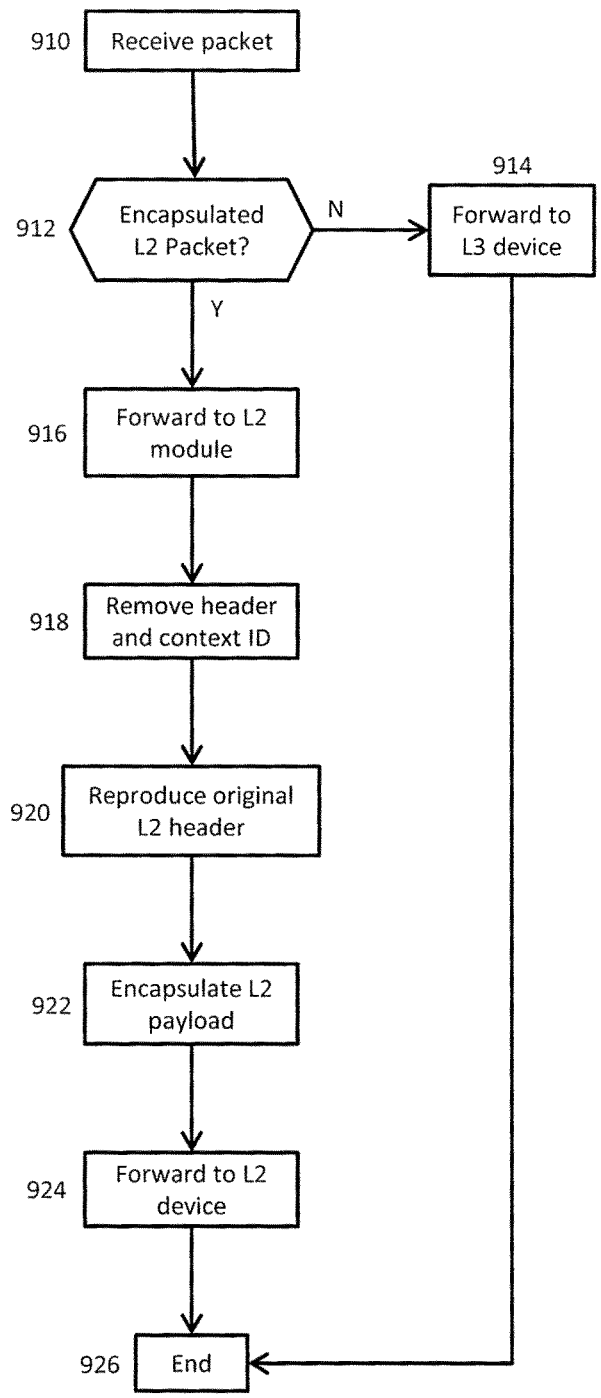
FIG. 9 is a flowchart illustrating processing of layer-2 and layer-3 services received over a layer-3 network, according to one embodiment

FIG. 9 is a flowchart illustrating processing of layer-2 and layer-3 services received over a layer-3 network, according to an embodiment. At 910, the packet is received over a layer-3 network, such as a satellite network. At 912, it is determined whether the received packet is an encapsulated layer-2 packet or not. If it is not an encapsulated layer-2 packet (i.e., it is a conventional layer-3 packet instead), then the packet is processed by the layer-3 module and forwarded to an appropriate layer-3 device or customer equipment. If the received packet is an encapsulated layer-2 packet, however, then it is forwarded to the layer-2 module. At 918, the IPv6 header and context ID are removed. At 920, the original layer-2 header is reproduced. At 922, the reproduced layer-2 header is used to encapsulate the layer-2 payload. The resulting layer-2 packet is forwarded to the customer device at 924. The process subsequently ends at 926.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
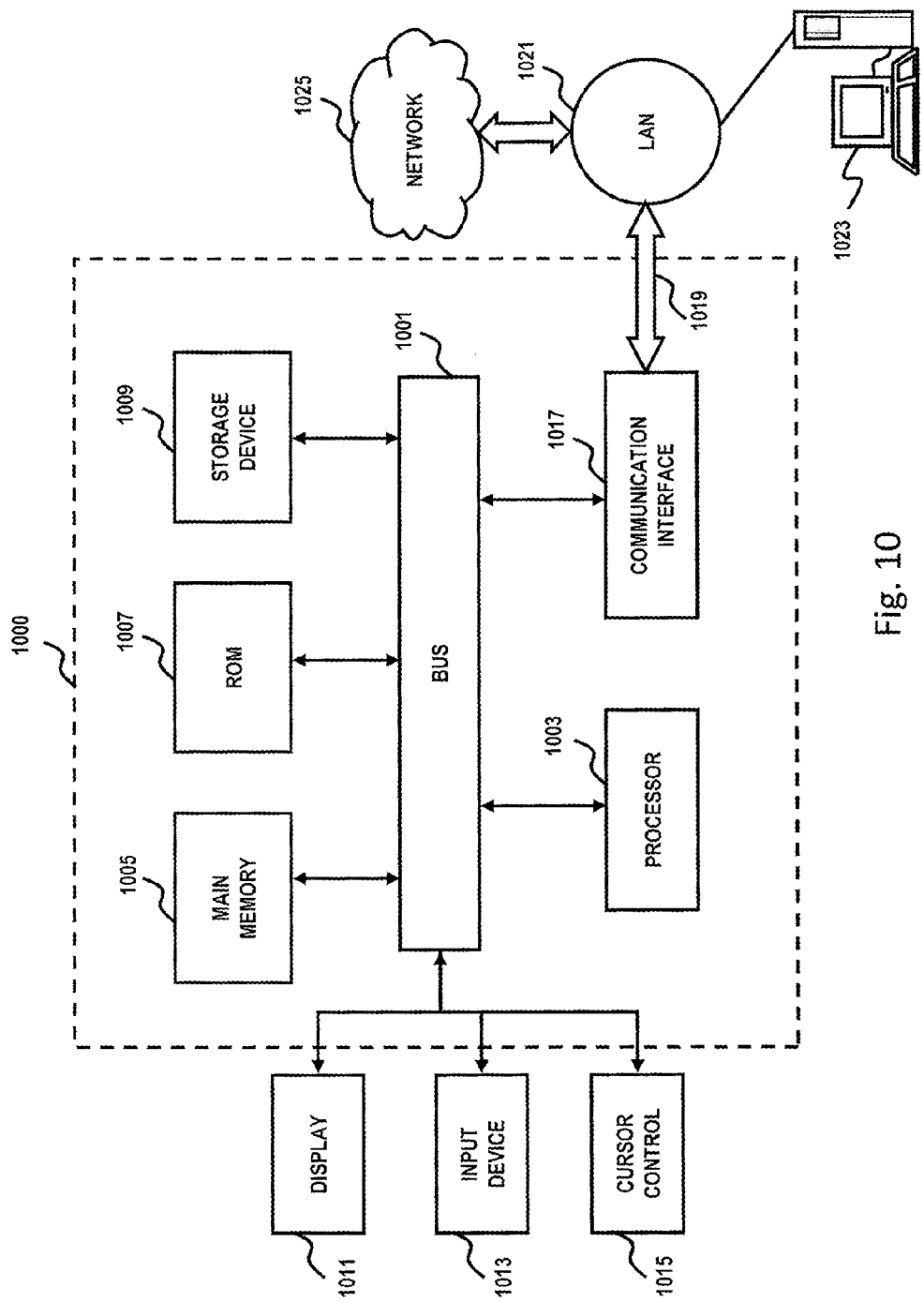
FIG. 10 is a diagram of a computer system that can be used to implement various exemplary embodiments.

FIG. 10 is a diagram of a computer system that can be used to implement various embodiments. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Non-volatile media can further include flash drives, USB drives, microSD cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 11:
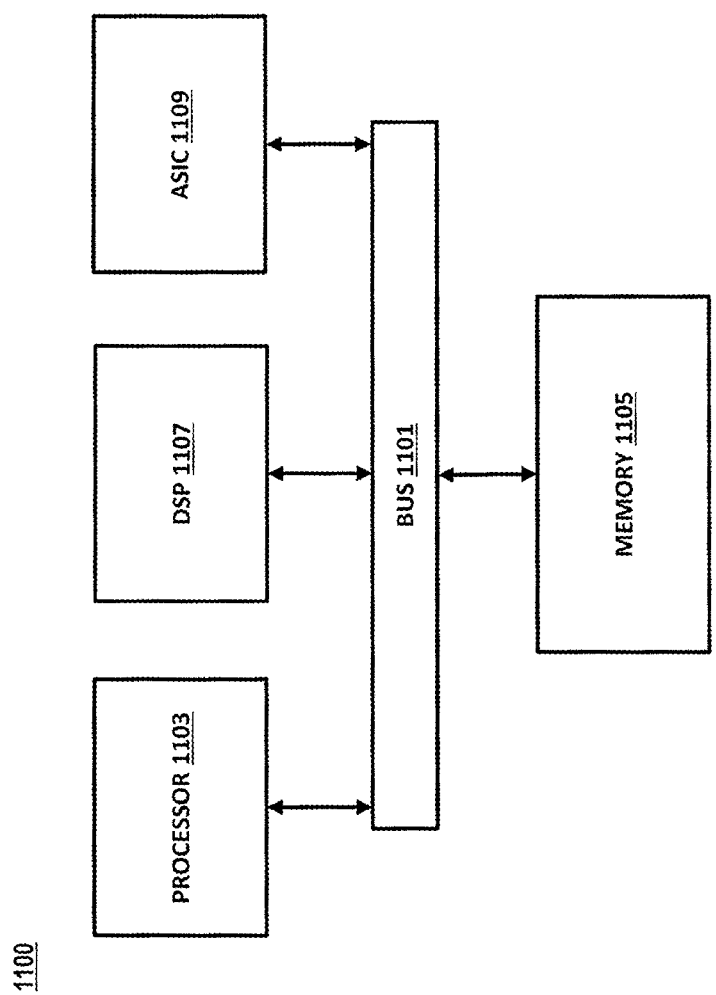
FIG. 11 is a diagram of a chip set that can be used to implement various exemplary embodiments.

FIG. 11 illustrates a chip set 1100 upon which an embodiment of the invention may be implemented. Chip set 1100 is programmed to implement various features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving layer-2 packets, at a satellite gateway, from one or more entities over a first communication network;
   generating a header for each layer-2 packet, each header including, in part, a wide area network (WAN) address associated with a destination terminal and a WAN address associated with the gateway, the destination terminal being selected from a plurality of destination terminals, and the gateway and plurality of destination terminals being part of a second communication network;
   creating a context ID for each layer-2 packet based, at least in part, on header information contained in each respective layer-2 packet;
   combining the header and context ID with a payload from each respective layer-2 packet to form an encapsulated layer-2 packet; and
   transmitting the encapsulated layer-2 packet to selected destination terminals over the second communication network,
   wherein the second communication network is a satellite network configured to carry only layer-3 packets.

2. The method of claim 1, wherein the transmitting further comprises transmitting the encapsulated layer-2 packets over one or more Ethernet Virtual Circuits (EVC) established between the gateway and the destination terminals on a per session basis.

3. The method of claim 2, wherein each EVC includes a plurality of logical backbones having predetermined priorities associated therewith, and further comprising:
   adding a traffic class to each header based, in part, on a VLAN tag associated with the respective layer-2 packet; and
   matching each traffic class to a corresponding logical backbone priority.

4. The method of claim 2, further comprising maintaining tables, at the gateway and each destination terminal, for mapping a VLAN tag from each layer-2 packet to a corresponding EVC.

5. The method of claim 1, further comprising:
   determining whether the payloads from the layer-2 packets are encrypted; and
   applying a performance enhancing proxy to IP streams having layer-2 packets with unencrypted payloads.

6. The method of claim 1, further comprising:
   maintaining Address Resolution Protocol (ARP) caches at the gateway and each destination terminal;
   performing a lookup of IP addresses within the ARP caches to obtain destination medium access control (MAC) addresses associated with the corresponding IP addresses; and
   sending a broadcast ARP message only for IP addresses not present in the ARP caches.

7. The method of claim 1, wherein:
   the header is an IPv6 header; and
   compression is applied to the IPv6 header prior to combining with the layer-2 payload.

8. The method of claim 1, further comprising:
   receiving layer-3 packets, at the gateway, from at least one of the one or more entities; and
   transmitting the encapsulated layer-2 packets and received layer-3 packets to one or more destination terminals over the second communication network.

9. An apparatus comprising:
   a layer-2 module having an interface for transmitting and receiving layer-2 packets to/from one or more entities over a first communication network; and
   a layer-3 module for receiving the layer-2 packets from the layer-2 module, the layer-3 module including: an interface for transmitting and receiving layer-3 packets, and at least one processor configured to:
      generate a header for each layer-2 packet, each header including, in part, a WAN address associated with a destination terminal and a WAN address associated with the interface of the layer-3 module, the destination terminal being selected from a plurality of destination terminals, and the interface of the layer-3 module and plurality of destination terminals being part of a second communication network;

create a context ID for each layer-2 packet based, at least in part, on header information contained in each respective layer-2 packet;

combine the header and context ID with a payload from each respective layer-2 packet to form an encapsulated layer-2 packet; and transmit the encapsulated layer-2 packet to selected destination terminals over the second communication network, wherein the second communication network is a satellite network configured to carry only layer-3 packets.

10. The apparatus of claim 9, wherein the at least one processor is further configured to:

establish one or more EVCs between the interface of the layer-3 module and the destination terminals on a per session basis; and transmit the encapsulated layer-2 packets over the one or more EVCs.

11. The apparatus of claim 10, wherein:

each EVC includes a plurality of logical backbones having predetermined priorities associated therewith; and the at least one processor is further configured to:

add a traffic class to each header based, in part, on a VLAN tag associated with the respective layer-2 packet; and match each traffic class to a corresponding logical backbone priority.

12. The apparatus of claim 10, wherein the at least one processor is further configured to maintain tables for mapping a VLAN tag from each layer-2 packet to a corresponding EVC.

13. The apparatus of claim 9, wherein the at least one processor is further configured to:

determine whether the payloads from the layer-2 packets are encrypted; and apply a performance enhancing proxy to IP streams having layer-2 packets with unencrypted payloads.

14. The apparatus of claim 9, wherein the at least one processor is further configured to:

maintain at least one ARP cache;

perform a lookup of IP addresses within the at least one ARP cache to obtain destination MAC addresses associated with the corresponding IP addresses; and send a broadcast ARP message only for IP addresses not present in the at least one ARP cache.

15. The apparatus of claim 9, wherein:

the header is an IPv6 header; and the at least one processor is further configured to compress the IPv6 header prior to combining with the layer-2 payload.

16. The apparatus of claim 9, wherein:

the layer-3 module further includes a second interface for transmitting and receiving layer-3 packets to/from at least one of the one or more entities; and the interface of the layer-3 module is configured to transmit and receive the encapsulated layer-2 packets and received layer-3 packets to/from one or more destination terminals over the second communication network.

17. A system comprising:

a plurality of destination terminals, each including an interface for transmitting and receiving layer-3 packets; and a satellite gateway including:

a layer-2 module having an interface for transmitting and receiving layer-2 packets from one or more entities over a first communication network;

a layer-3 module for receiving the layer-2 packets from the layer-2 module, and including an interface for transmitting and receiving layer-3 packets; and at least one processor configured to:

generate a header for each layer-2 packet, each header including, in part, a WAN address associated with a selected destination terminal and a WAN address associated with the interface of the layer-3 module, the interface of the layer-3 module and plurality of destination terminals being part of a second communication network;

create a context ID for each layer-2 packet based, at least in part, on header information contained in each respective layer-2 packet; and combine the header and context ID with a payload from each respective layer-2 packet to form an encapsulated layer-2 packet, wherein the interface of the layer-3 module is configured to transmit the encapsulated layer-2 packet to selected destination terminals over the second communication network, and wherein the second communication network is a satellite network configured to carry only layer-3 packets.

18. The system of claim 17, wherein the at least one processor is further configured to:

establish one or more EVCs between the interface of the layer-3 module and the destination terminals on a per session basis; and transmit the encapsulated layer-2 packets over the one or more EVCs.

19. The system of claim 18, wherein:

each EVC includes a plurality of logical backbones having predetermined priorities associated therewith; and the at least one processor is further configured to:

add a traffic class to each header based, in part, on a VLAN tag associated with the respective layer-2 packet; and match each traffic class to a corresponding logical backbone priority.

20. The system of claim 18, wherein the at least one processor is further configured to maintain tables for mapping a VLAN tag from each layer-2 packet to a corresponding EVC.

21. The system of claim 17, wherein the at least one processor is further configured to:

determine whether the payloads from the layer-2 packets are encrypted; and apply a performance enhancing proxy to IP streams having layer-2 packets with unencrypted payloads.

22. The system of claim 17, wherein the at least one processor is further configured to:

maintain at least one ARP cache;

perform a lookup of IP addresses within the at least one ARP cache to obtain destination MAC addresses associated with the corresponding IP addresses; and send a broadcast ARP message only for IP addresses not present in the at least one ARP cache.

23. The system of claim 17, wherein:

the header is an IPv6 header; and the at least one processor is further configured to compress the IPv6 header prior to combining with the layer-2 payload.

24. The system of claim 17, wherein:
- the layer-3 module further includes a second interface for transmitting and receiving layer-3 packets to/from at least one of the one or more entities; and
- the interface of the layer-3 module is configured to transmit and receive the encapsulated layer-2 packets and received layer-3 packets to/from one or more destination terminals over the second communication network.

25. The system of claim 17, wherein the selected destination terminal includes:
- a layer-3 module including interface for transmitting and receiving encapsulated layer-2 packets to/from the layer-3 module of the gateway; and
- a layer-2 module for receiving the encapsulated layer-2 packets from the layer-3 module, and reconstructing the original layer-2 packet based, at least in part, on the header and context ID.

* * * * *